United States Patent
Baramov

(10) Patent No.: US 7,987,145 B2
(45) Date of Patent: Jul. 26, 2011

(54) TARGET TRAJECTORY GENERATOR FOR PREDICTIVE CONTROL OF NONLINEAR SYSTEMS USING EXTENDED KALMAN FILTER

(75) Inventor: Lubomir Baramov, Prague (CS)

(73) Assignee: Honeywell Internationa, Morristown, NJ (US)

( * ) Notice: Subject to any disclaimer, the term of this patent is extended or adjusted under 35 U.S.C. 154(b) by 753 days.

(21) Appl. No.: 12/051,381

(22) Filed: Mar. 19, 2008

(65) Prior Publication Data

US 2009/0240480 A1 Sep. 24, 2009

(51) Int. Cl.
*G06F 15/18* (2006.01)
*G06E 1/00* (2006.01)
*G06E 3/00* (2006.01)
*G06G 7/00* (2006.01)

(52) U.S. Cl. .......................................................... 706/21
(58) Field of Classification Search ....................... 706/21
See application file for complete search history.

(56) References Cited

U.S. PATENT DOCUMENTS

| | | | |
|---|---|---|---|
| 5,426,732 A * | 6/1995 | Boies et al. .................... 715/839 |
| 5,740,033 A * | 4/1998 | Wassick et al. ................. 700/29 |
| 6,056,781 A * | 5/2000 | Wassick et al. ................. 703/12 |
| 6,532,454 B1 * | 3/2003 | Werbos ............................. 706/14 |
| 6,682,669 B2 * | 1/2004 | Bulgrin et al. ................ 264/40.1 |
| 6,826,521 B1 | 11/2004 | Hess et al. ........................ 703/12 |
| 6,980,938 B2 | 12/2005 | Cutler ................................ 703/2 |
| 7,092,863 B2 | 8/2006 | Goldman et al. ................ 703/13 |
| 7,209,938 B2 * | 4/2007 | Lipp .............................. 708/300 |
| 7,263,473 B2 | 8/2007 | Cutler ................................ 703/2 |
| 7,272,454 B2 | 9/2007 | Wojsznis et al. ................. 700/29 |
| 7,277,779 B2 | 10/2007 | Zima et al. ..................... 700/292 |
| 7,716,535 B2 * | 5/2010 | Cunningham et al. .......... 714/48 |
| 2006/0287741 A1 | 12/2006 | Cutler ............................. 700/83 |
| 2007/0050053 A1 | 3/2007 | Cutler ............................. 700/34 |
| 2007/0225835 A1 | 9/2007 | Zhu ................................. 700/44 |

OTHER PUBLICATIONS

On Markovian fragments of COCOLOG for logic control systems, Wei, Y.J.; Caines, P.E.; Decision and Control, 1992., Proceedings of the 31st IEEE Conference on Digital Object Identifier: 10.1109/CDC.1992.371269 Publication Year: 1992 , pp. 2967-2972 vol. 3.*

The miniaturization technologies: past, present, and future, Frazier, B.; Friedrich, C.; Warrington, R.O.; Industrial Electronics, Control and Instrumentation, 1994. IECON '94., 20th International Conference on vol. 3 Digital Object Identifier: 10.1109/IECON.1994. 398029 Publication Year: 1994 , pp. 1460-1465 vol. 3.*

(Continued)

*Primary Examiner* — Michael Holmes
(74) *Attorney, Agent, or Firm* — Kermit D. Lopez; Luis M. Ortiz; Tuesday A. Kaasch

(57) ABSTRACT

A model predictive controller (MPC) for predictive control of nonlinear processes utilizing an EKF (Extended Kalman Filter) and a nominal trajectory generator. The nominal trajectory generator includes another instance of EKF, a linear corrector, and a time-varying deviation model. A nominal control trajectory can be predicted and an optimal solution for the time-varying deviation model can be computed based on an approximation of a system inverse known as signal deconvolution. The EKF can be utilized to estimate a current process state by supplying a measured output and to predict a future nominal trajectory by supplying a reference output. A Kalman smoother can also be utilized for the signal de-convolution in order to obtain enhanced trajectory estimates.

21 Claims, 8 Drawing Sheets

OTHER PUBLICATIONS

Adaptive CSI Prediction in Linear Multi-User MIMO Systems, Mielczarek, Bartosz; Krzymien, Witold A.; Vehicular Technology Conference Fall (VTC 2009—Fall), 2009 IEEE 70th Digital Object Identifier: 10.1109/VETECF.2009.5378981 Publication Year: 2009, pp. 1-5.*

Experiments with a target-threshold control theory model for deriving Fitts' law parameters for human-machine systems, Cannon, D.J.; Systems, Man and Cybernetics, IEEE Transactions on vol. 24, Issue: 8 Digital Object Identifier: 10.1109/21.299694 Publication Year: 1994, pp. 1089-1098.*

Constrained Model Predictive Control: Stability and Optimality; D.Q. Mayne, J. B. Rawlings, C.V. Rao, P.O.M. Scokaert; www.elsevier.com/locate/automatica; Automatica 36 (2000) 789-814.

A Survey of Industrial Model Predictive Control Technology; S. Joe Qin, Thomas A. Badgwell; www.elsevier.com/locate/conengprac; Control Engineering Practice 11 (2003) 733-764.

* cited by examiner

TARGET TRAJECTORY GENERATOR FOR PREDICTIVE CONTROL OF NONLINEAR SYSTEMS USING EXTENDED KALMAN FILTER

TECHNICAL FIELD

Embodiments are generally related to process control systems and methods. Embodiments are also related to MPC (Model-based Predictive Control) processes. Embodiments are additionally related to nonlinear process state estimation and control techniques. Embodiments are also related to EKF (Extended Kalman Filtering) techniques for predictive control of nonlinear systems.

BACKGROUND OF THE INVENTION

Process control systems, such as distributed or scalable process control systems, can be utilized in chemical, petroleum and other industrial processes. A typical process control system includes one or more process controllers communicatively coupled to each other, to at least one host or operator workstation and to one or more field devices via analog, digital or combined analog/digital buses.

A common approach to advanced industrial process control involves the use of MPC (Model-based Predictive Control) techniques. MPC is a control strategy that utilizes an optimizer to solve for a control trajectory over a future time horizon based on a dynamic model of the process. MPC technology utilizes a mathematical model representation of the process. The models are then utilized to predict the behavior of dependent variables (e.g., controlled variables, CVs) of a dynamic system with respect to variations in process independent variables (e.g., manipulated variables, MVs). In a typical implementation, the MPC computes a future sequence of manipulated variables that optimize certain performance-related criterion involving future process trajectories, with respect to various constraints. From the optimal sequence of future manipulated variables, only the first manipulated variable is actually applied to the process. Then, measured process variables can be utilized to update the internal process model and the process is repeated.

A number of MPC approaches have been implemented and discussed in MPC-related literature. For example, the article entitled "Constrained model predictive control: Stability and optimality" by D. Q. Mayne, et al., Automatica 36 (2000), pp. 789-814, provides a good survey of MPC approaches and principals, and is incorporated herein by reference in its entirety. Another article, which is incorporated herein by reference, describes MPC principals and technique and is entitled "A survey of industrial model predictive control technology" by S. Joe Qin, et al., Control Engineering Practice 11 (2003), pp. 733-764.

In general, controlled processes are typically nonlinear in nature, (i.e., they cannot be accurately described by the mathematical model with linear relations among the inputs, the states and the outputs). The majority of industrial MPC techniques utilize linear models that are not sufficiently accurate because of process nonlinearities. Hence, if an operating point in the process changes, the controller may perform poorly. There are approaches for adapting the internal model to changing operating condition by some kind of interpolation among models corresponding to different (steady-state) operating points (e.g., gain scheduling). These approaches are non-optimal during the transition between the operating points unless the transition is very slow.

KF (Kalman Filtering) is an optimal filtering technique commonly utilized for estimating the state variables of a linear system. Kalman filtering is a time domain operation that is suitable for use in estimating the state variables of linear time-varying systems that can be described by a set of linear differential equations with time-varying coefficients. Kalman filtering approaches have found applications in state estimation in many systems that may be approximately described as linear. Moreover, they can be utilized for estimating unknown inputs of specific classes by augmenting the process model by an appropriate input generator. The basic Kalman filter technique cannot accommodate general nonlinear systems. The Kalman filter can be utilized to estimate states in nonlinear systems based on quasi-linearization techniques.

Such techniques, among which is that referred to as EKF (extended Kalman filter), when restricted to computationally feasible methods, result in sub-optimal estimators, which do not yield minimal error estimation. However, applications of these suboptimal filters often yield satisfactory results in the industrial practice. KFs (EKFs) are used in conjunction with MPC when the latter uses the state-space representation of the process model and process state is not directly measurable. Then, MPC uses the state estimate of KF (EKF) to predict future process behavior. Moreover KF (EKF) may be used for estimating unmeasured inputs (disturbance variables, DVs) of specific forms to further improve predictions of process behavior resulting in an enhanced control performance.

The majority of prior art MPC approaches with a linear internal model utilize the formulation of the optimization problem leading to Quadratic Programming (QP) (i.e., optimization of quadratic cost function subject to linear constraints). There exist fast and reliable QP solvers that fully satisfy the requirements for application in real-time control. Utilizing the non-linear internal model results in a general nonlinear programming problem; algorithms for solving these general problems require more computational effort and are less reliable compared to those used for QP. Some of prior art nonlinear MPC approaches utilize linear approximation (linearization) of the internal model around a nominal trajectory. The time-varying linear system arising from this linearization describes deviations of the process trajectory from the nominal one. This approximation is accurate if the deviations are small. The optimization technique under discussion optimizes the deviation trajectories, using the QP problem, The optimal deviations are utilized for updating the nominal trajectory and the process (linearization, QP) is repeated in an iterative process, known as SQP (Sequential Quadratic Programming).

Based on the foregoing it is believed that a need exists for a predictive controller, which is capable of handling a broad class of non-linear processes without extensive computational effort associated with solving a general non-linear program. A possible way to achieve this goal is to obtain a nominal process trajectory that is reasonably close to the optimal one, thus eliminating the necessity of iterative process including QP as in the SQP technique. Hence, it is also believed that a need exists for a nominal (target) trajectory generator for predictive control of nonlinear processes. Utilizing an extended Kalman filter for estimating this future nominal trajectory is particularly appealing, because this filter is, in many cases, already used for estimating unknown process states.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved model-based predictive controller, which is capable of controlling nonlinear processes while using a single quadratic optimization per control step.

It is another aspect of the present invention to provide for a nominal target trajectory generator, where a nominal state and input trajectories of the process model are estimated from future expected set-point and disturbance trajectories. A nonlinear process model can be then linearized along these nonlinear trajectories. Thus, the obtained linear approximation of the nonlinear process can be utilized for computing the future control sequence. This sequence is optimal with respect to the linearized model, but sub-optimal for the original non-linear one. Nevertheless, it is expected that, in a vast majority of practical situations, this control sequence represents a good or acceptable approximation of one that is truly optimal (i.e., which considers the non-linear process model).

The aforementioned aspects and other objectives and advantages can now be achieved as described herein. A model predictive controller for predictive control of nonlinear processes utilizing an extended Kalman filter (EKE) and a nominal trajectory generator is disclosed. The EKF computes, as is customary in the industrial practice, current state estimate (and possibly disturbance estimates, if needed), utilizing latest process measurements. The nominal trajectory generator includes another instance of EKF, a linear corrector, and a time-varying deviation model. The nominal control trajectory can be predicted based on an approximation of a system inverse known as signal de-convolution.

This use of EKF for signal de-convolution, which is the main innovation of the present invention, is utilized to predict a future nominal trajectory by processing a future reference (set-point) signal and (anticipated) future disturbances. Linear corrector is a linear time varying system used for correcting the nominal output trajectory estimate of EKF utilizing an output prediction error signal of EKF. A Kalman smoother can also be utilized for the signal de-convolution in order to obtain better trajectory estimates. EKF can provide, as a by-product of the trajectory estimation, a linear approximation of the state-space representation of the process model around the trajectory. The linearized model describes the dynamics for the deviation of the process state from the nominal trajectory. The deviation model is then optimized on the prediction horizon to achieve the desired controlled performance.

Future EKF-based trajectory estimation involves estimating unknown manipulated variables. A standard technique for unknown input estimation (normally used for estimating unknown disturbances) is to assume that it is generated by a specific autonomous dynamical system that is appended to the process model. Then, states of this generator are estimated in the same way as process states, and the unknown input estimate is computed from the estimated generator states. As can be appreciated by those skilled in the art, the assumption for the convergence and stability of EKF is that unstable modes of the process model (i.e., augmented by all unknown input generators) are observable from measured outputs. This assumption may not be satisfied if there are more estimated inputs than measured outputs. If this is the case, the proposed method still may be utilized; the manipulated variables suitable for rapid response can then be selected for estimating by the EKF and the rest of the manipulated variable trajectories can be selected by interpolating their current and steady-state values. Alternatively, several manipulated variables for the purpose of nominal trajectory generation can be made linearly dependent, and their combination can be estimated by the EKF.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
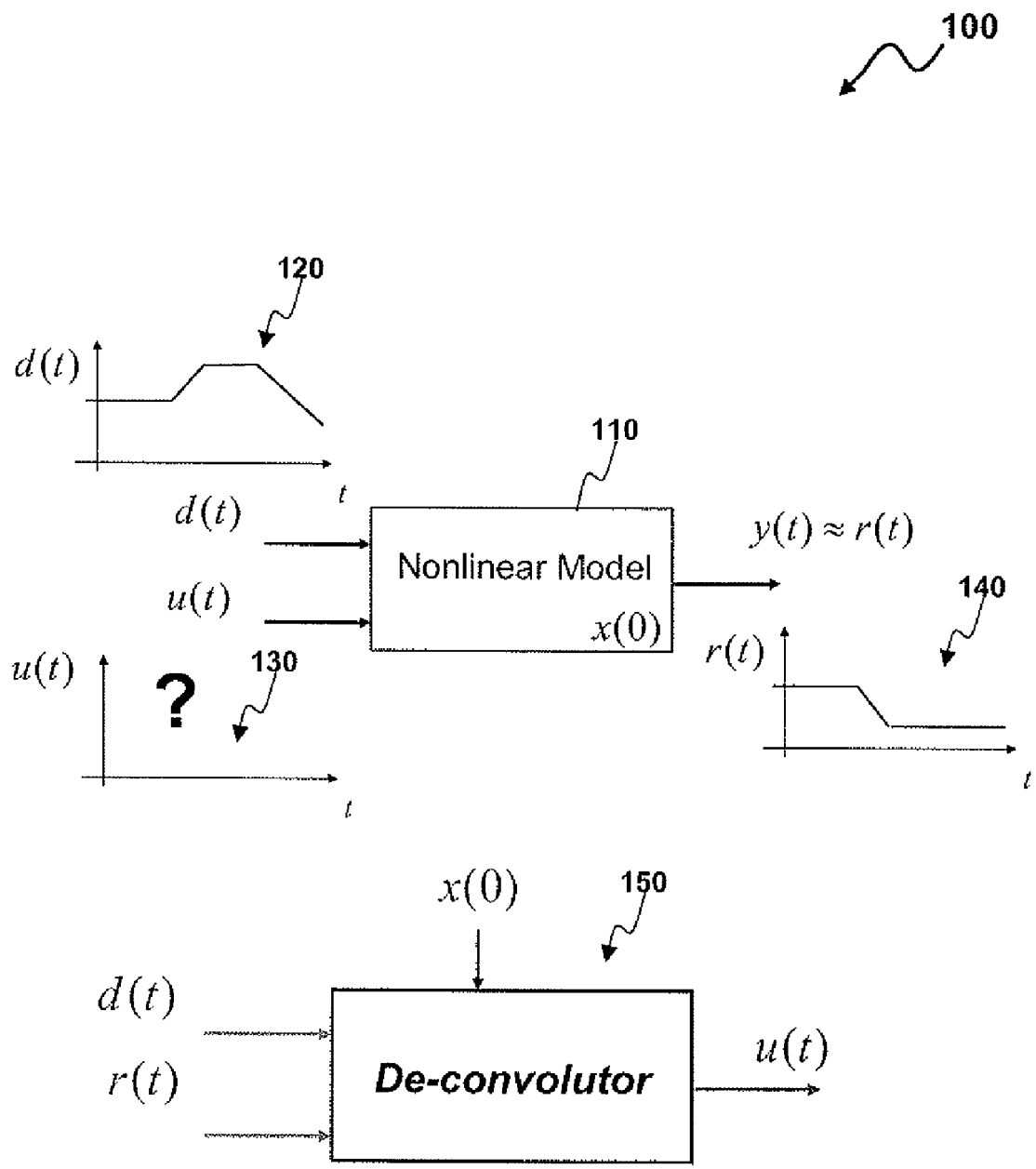
FIG. 1 illustrates a schematic view of a nonlinear process control model for determining some of the process inputs when other process inputs and initial state are known so that the process output follows a predetermined reference trajectory as closely as possible, which can be implemented in accordance with a preferred embodiment.

Referring to FIG. 1, a schematic view of a nonlinear process control model 100 is illustrated in accordance with a preferred embodiment. A general state representation of the process control model 100 can be defined as equation (1):

$$x\&=f(x,u,d,t)$$

$$y=h(x,u,d,t) \quad (1)$$

where x represents a vector of state variables, u represents a vector of control inputs or manipulated variables, y represents a vector of outputs or controlled variables, d represents disturbance variables and t represents time. The state variables $x(t)$ and the manipulated variables $u(t)$ can be expressed as depicted in equation (2) below:

$$x(t)=x_n(t)+x_{dev}(t); \quad u(t)=u_n(t)+u_{dev}(t) \quad (2)$$

The sub-script n as shown in equation (2) represents a 'nominal' value and the sub-script dev represents 'deviation'. The nonlinear process control model 100 can be used in advanced process control techniques in which a "nonlinear" dynamic model 110 is utilized to predict future process behavior. The nonlinear process control model 100 can be utilized for computing the process responses over a prediction horizon, which is based on the values of the manipulated variables u(t) and the current controlled variable values y(t). The values of the manipulated variables u(t) are optimized at discrete points throughout a control horizon to minimize an appropriate cost function, subject to various constraints. The cost function is assumed to contain a penalty term related to an error between the desired set point profile and the predicted outputs.

The nonlinear process control model 100 depicted in FIG. 1 generally receives the disturbance variable d(t) and the manipulated variable u(t) as input. The trajectory 120 of the disturbance variable d(t) and an initial state x(0) can be assumed. The deviation trajectory can be approximated, utilizing the standard linearization technique, by a linear time-varying model as shown in equation (3), provided the state trajectory is in the vicinity of the nominal one.

$$\dot{x}_{dev}=A(t)x_{dev}+B(t)u_{dev}; \, y_{dev}=C(t)x_{dev}+D(t)u_{dev} \quad (3)$$

Time-varying matrices are the Jacobian matrices, or first-order partial derivatives of the respective functions f and h, evaluated at the nominal trajectory, such as shown in equation (4) below:

$$A(t) = \frac{\partial f(x, u, d, t)}{\partial x}\bigg|_{\substack{x(t)=x_n(t), \\ u(t)=u_n(t)}} \quad (4)$$

$$B(t) = \frac{\partial f(x, u, d, t)}{\partial u}\bigg|_{\substack{x(t)=x_n(t), \\ u(t)=u_n(t)}}$$

$$C(t) = \frac{\partial h(x, u, d, t)}{\partial x}\bigg|_{\substack{x(t)=x_n(t), \\ u(t)=u_n(t)}}$$

$$D(t) = \frac{\partial h(x, u, d, t)}{\partial u}\bigg|_{\substack{x(t)=x_n(t), \\ u(t)=u_n(t)}}$$

Figure 5:
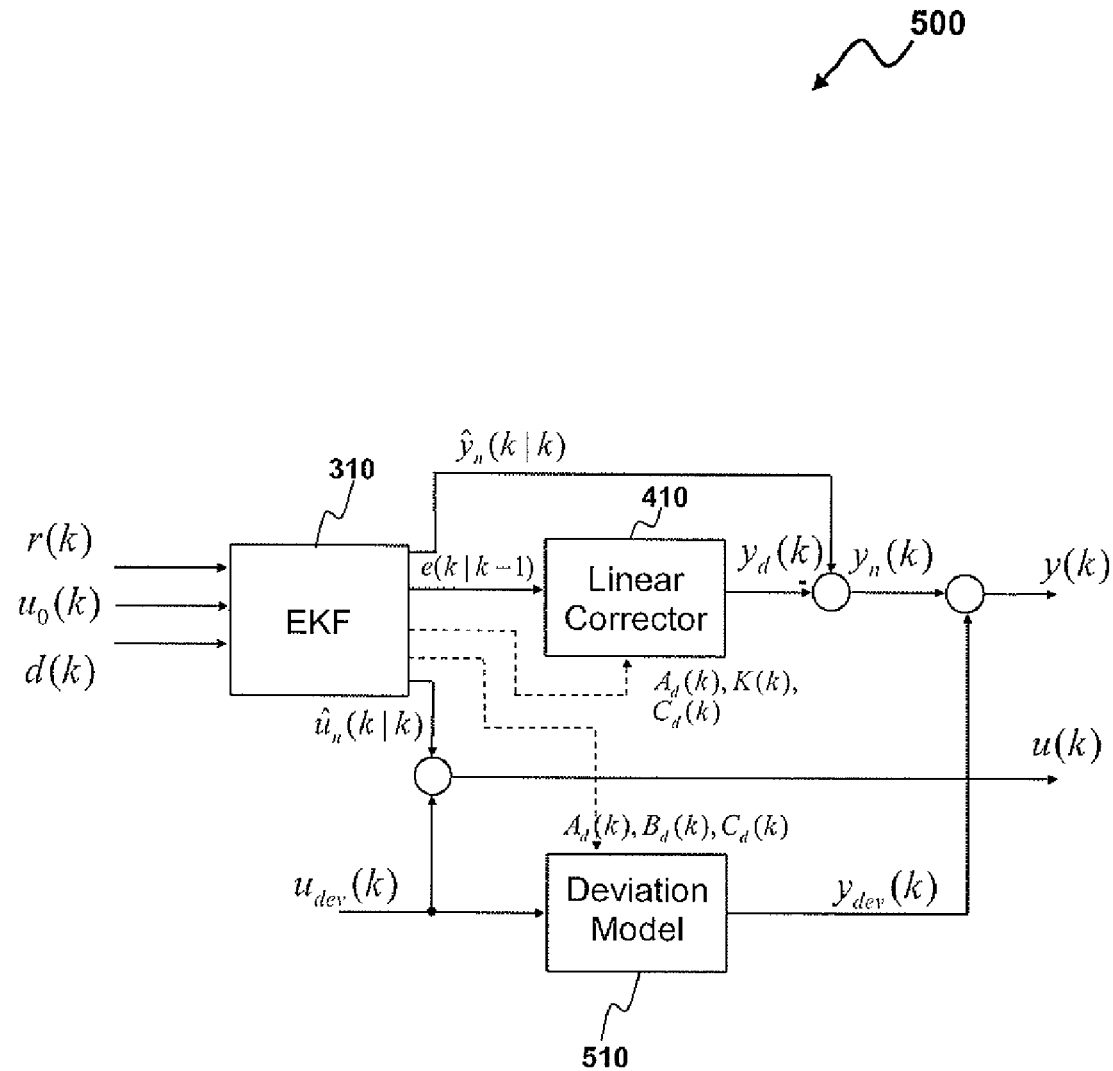
FIG. 5 illustrates a block diagram of a prediction model with the nominal trajectory generator, which can be implemented in accordance with a preferred embodiment.

A discrete-time representation can be utilized in sampled time control systems. For a deviation system 510 such as shown in FIG. 5, upon the assumption that the input u(t) is constant during the sampling period, its discrete time version can be written as depicted by equation (5) below:

$$x_{dev}(k+1)=A_d(k)x_{dev}(k)+B_d(k)u_{dev}(k)$$

$$y_{dev}(k)=C_d(k)x_{dev}(k) \quad (5)$$

The matrices $A_d$, $B_d$ and $C_d$ can be obtained by integrating the Jacobians as shown in equation (4) on the sampling period and the matrix exponential can be applied. This approach is known to people skilled in system theory. The k-th output sampling can be assumed to precede the instant of applying the input u(k) and hence the direct feed-through term in equation (5) can be eliminated.

A linear time-varying model as shown in equation (3) can be sufficient for predicting the trajectory of the original nonlinear system 100 with acceptable accuracy, if the process state trajectory is in the vicinity of the nominal trajectory. It should be noted that the optimization problem solved in MPC attempts to drive the process so that its output trajectories are close to a given reference trajectory. Thus, it is necessary to determine nominal state and input trajectories, which result in an output trajectory close to the reference trajectory. It can be assumed that these nominal trajectories are sufficiently close to the unknown optimal trajectories and hence, the linearization error can be neglected. As shown in FIG. 1, the initial state, some of process inputs 120 such as disturbance d and the process output (assumed to be approximately equal to the reference r) can be assumed to be known in order to obtain the corresponding input 130 denoted as u(t).

The problem of determining inputs when outputs are known by means of a dynamical system as depicted in FIG. 1, and sometimes referred to as de-convolution. For those skilled in the art, it can be appreciated that designing a system for exact de-convolution may not be possible. Hence, a de-convolutor 150 can be utilized for approximate de-convolution, which takes the reference r and the disturbance d as inputs, produces signal u so that when applied to the original system 110 as input 130, together with disturbance 120, the output trajectory y approximately follows reference r.

Figure 2:
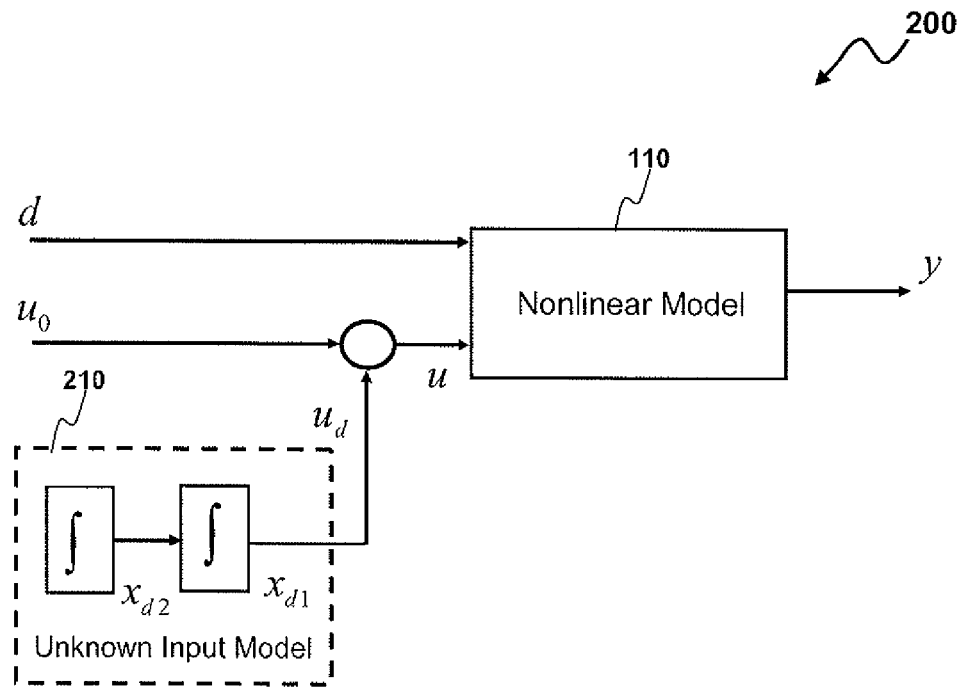
FIG. 2 illustrates a block diagram of the nonlinear process control model augmented by a disturbance generator, which can be implemented in accordance with a preferred embodiment.

Referring to FIG. 2, a block diagram of a nonlinear process control model 200 augmented by a disturbance generator is illustrated, in accordance with a preferred embodiment. As depicted in FIG. 2, the input u(t) to the nonlinear model 110 possesses two components: a known base-line value u(t) and an unknown input component or an output $u_d$ from an unknown input model 210. The unknown input model 210 may include a cascade of two integrators: $x_{d1}$ and $x_{d2}$. The state $x_{d1}$ represents a current value of the input component whereas the state $x_{d2}$ represents the rate-of-change of the input component. The estimates of the modes $x_{d1}$ and $x_{d2}$ thus provide an estimate of the unknown input component $u_d$, which converges to the correct value, provided $u_d$ is a ramp function.

Figure 3:
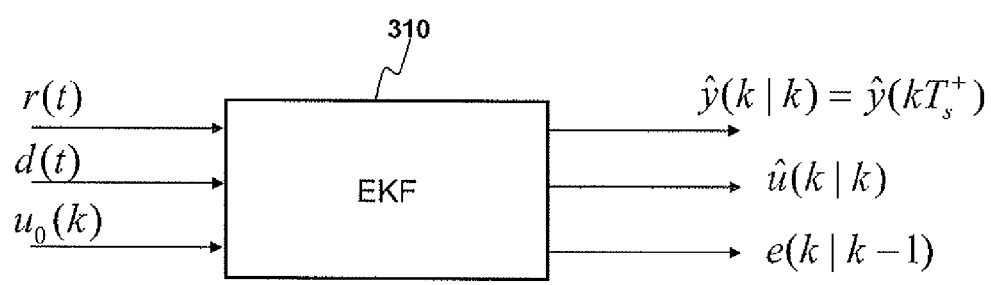
FIG. 3 illustrates a block diagram of an extended Kalman filter for de-convolution, which can be implemented in accordance with a preferred embodiment.

Referring to FIG. 3, a block diagram of an extended Kalman filter 300 for de-convolution is illustrated, which can be implemented in accordance with a preferred embodiment. EKF (Extended Kalman filter) is a generalization of a Kalman filter, which can be utilized for non-linear process 200. The EKF 310 utilizes a linear approximation of a state-space model around the state-mean computed in a last step, to obtain a covariance matrix of the state prediction error. This covariance matrix is further used for computing an internal parameter, referred to as Kalman gain. The update of the state mean is based fully on the nonlinear model. The EKF 310 can be widely utilized in the process control and in the aerospace. The EKF 310 for nonlinear process control model 100 for time within one sampling period can be described, as shown in equation (6).

$$\dot{\hat{x}} = f(\hat{x}(t), u(k), d(t), t), \, t \in (kT_s^+, (k+1)T_s^-) \quad (6)$$

$$\hat{x}(kT_s^+) = \hat{x}(kT_s^-) + K(k)e(k|k-1)$$

$$e(k|k-1) = y(kT_s) - h(\hat{x}(\tau), u(k), d(\tau), \tau)|_{\tau=kT_s^-}$$

The superscript +/− as shown in equation (6) denotes time immediately after and/or before the change of the manipulated variable u(t). Further, matrix K(k) represents Kalman gain whose exact form is known to those skilled in Kalman filtering and which utilizes the discrete-time version of the plant model. Variable e(k|k−1) represents an output prediction error also called as an innovation term. The EKF 310 can be utilized for estimating unknown inputs u(t), if the process model 200 can be augmented by the exosystem or the unknown input model 210 as shown in FIG. 2. The outputs of the EKF 310 include a filtered output, as shown in equation (7), the one-step output prediction error e(k|k−1), and the current unknown input estimate û(k|k)=u₀(k)+$x_{d1}$(k$T_S^+$).

$$\hat{y}(k|k) = h(\hat{x}(kT_S^+), \hat{u}(k|k), d(kT_S), kT_S^+) \quad (7)$$

Hence, the target reference trajectory r(t) can be supplied to the EKF 310 instead of the measured plant output y(t) in order to estimate the input $u_0+u_d$ as shown in FIG. 2, which results in an approximate signal de-convolution. The EKF 310 also produces linear approximations of the state model described in equation (4) and their discrete-time counterparts used in equation (5) (as a step to computing Kalman gain) that can be used in optimizing the deviation trajectory.

Figure 4:
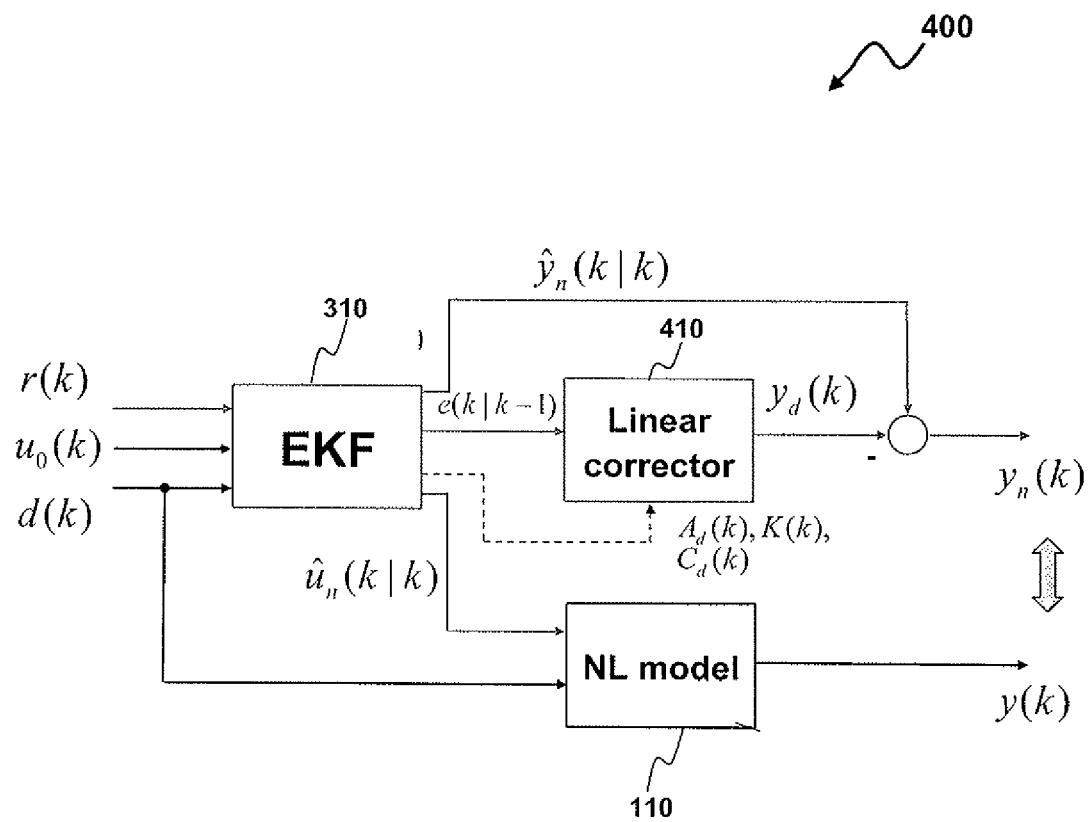
FIG. 4 illustrates a block diagram of a nominal trajectory generator for approximate de-convolution, which can be implemented in accordance with a preferred embodiment.

FIG. 4 illustrates a block diagram of a nominal trajectory generator 400 for approximate de-convolution, which can be implemented in accordance with a preferred embodiment. The nominal trajectory generator 400 can be made of the EKF 310 and a linear corrector 410. The nonlinear system 110 can be added to the nominal trajectory generator 400 for illustrating the function of the trajectory generator 400. The EKF 310 can be tuned such that its output denoted as $\hat{y}_n$(k|k) tracks the reference r(k) with possibly a small error around times when the reference changes its value and/or a step in the rate-of-change of the reference occurs. Another output of the EKF 310 is the estimate of the plant input, denoted as $\hat{u}_n$(k|k) in FIG. 4.

Such an input estimate can be applied to the nonlinear model 110 whose output is denoted as y(k). The output y(k) may lag behind both the EKF output $\hat{y}_n$(k|k) and reference r(k) temporarily during transitions and hence, the de-convolution by the EKF 310 is approximate. This is due to the fact that the EKF 310 needs some time to track the unknown input rate of change, if it had changed. The nominal trajectory generator 400 includes a linear, parameter-varying system denoted as the linear corrector 410 which estimates the difference between the above mentioned trajectories y(k) and ŷ(k|k) at sampling instants. The innovation term e(k|k−1) of the EKF 310 can be applied as an input of the linear corrector 410 and produces the signal $y_d$(k) as its output. The equation of the linear corrector 410, that is in fact a linearization of the EKF 310, is given by equation (8). Time-varying matrices $A_d$ and $C_d$ come from the discrete-time representation (5) of the linearized system (3) and are computed by EKF, as is Kalman gain K.

$$x_p(k+1) = A_d(k)(x_p(k) + K(k)e(k|k-1))$$

$$y_d(k) = C_d(k)(x_p(k) + K(k)e(k|k-1)) \quad (8)$$

Subtracting $y_d$(k) from ŷ(k|k) closely approximates the nonlinear process output y(k), if the nonlinear system is fed with the estimated input $\hat{u}_n$(k|k). It can be said that the linear corrector 410 compensates the effect of the output prediction error of the EKF 310 on the de-convolution. In the following development, the nominal output trajectory utilized for control design is assumed as equation (9).

$$y_n(k) = \hat{y}_n(k|k) - y_d(k) \quad (9)$$

FIG. 5 illustrates a block diagram of a prediction model 500 with the trajectory generator, which can be implemented in accordance with a preferred embodiment. However, in accordance with the present invention, the prediction model 500 can be equipped with the nominal trajectory generator 400 that is made of the EKF 310 and the linear corrector 410 and that generates the future nominal trajectory. The prediction model 500 further includes a linear, time-varying deviation model 510 which predicts future trajectories of the deviation of the nonlinear output trajectory from the linear one. The deviation model 510 is driven by the input deviation $u_{dev}$(k).

The prediction model for $y_{dev}$ utilizes parameters of the linearized, discrete-time model $A_d$(k), $B_d$(k), $C_d$(k), as shown in equation (5), which are computed by the EKF 310 during the nominal trajectory generation. The deviation output $y_{dev}$ can be computed by the standard procedure for linear, time varying systems. For the future instant—i steps after the current instant k—the output is computed as shown in equation (10).

$$y_{dev}(k+i) = \quad (10)$$
$$C_d(k+i)\left[\sum_{j=0}^{i-2}\binom{A_d(k+i-1)\times}{L\times A_d(k+j+1)}B_d(k+j)u_{dev}(k+j)++\right.$$
$$\left. B_d(k+i-1)u_{dev}(k+i+1)\right]$$

Note that the state $x_{dev}$ can be reset to zero at time k. A Kalman smoother (not shown) can also be utilized for model de-convolution, which may lead to better trajectory estimates. The filter convergence and stability is not guaranteed when the combined process and input generator model is not observable as would be readily understood by those skilled in art. This may happen if there are more manipulated variables than the controlled variables in the process (i.e., dimension of u(k) is larger than the dimension of y(k)). Hence, it may not be possible to estimate independently all manipulated variables by the EKF 310. Hence, some of the manipulated variable trajectories can be chosen prior by interpolating the current value and the optimal steady-state value. The manipulated variables suitable for rapid response can then be selected for estimating by the EKF 310. Alternatively, several manipulated variables for the purpose of nominal trajectory generation can be made linearly dependent, and their combination can be estimated by the EKF.

Figure 6:
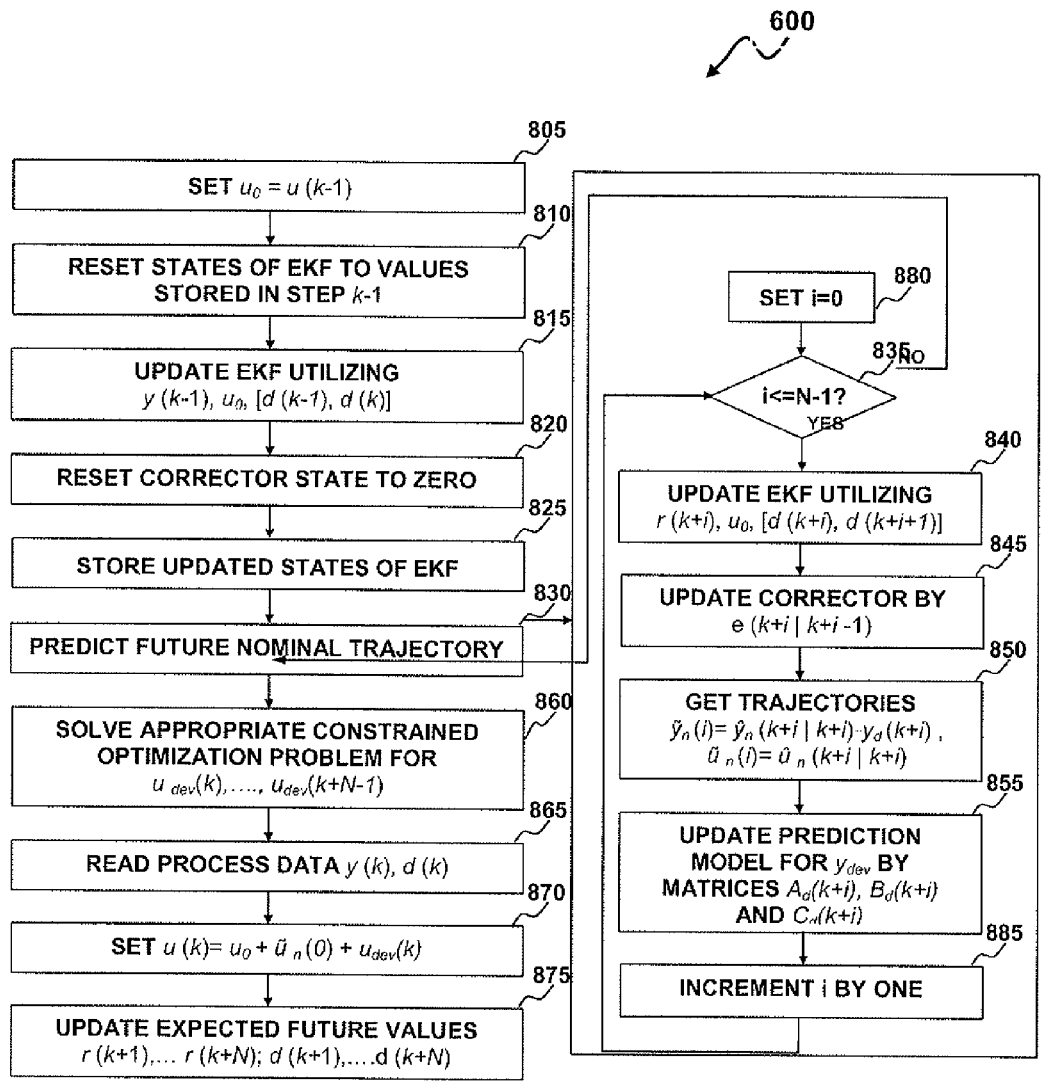
FIG. 6 illustrates a detailed flow chart of operations illustrating logical operational steps of a method for a single control step of the MPC utilizing the trajectory generator, which can be implemented in accordance with an exemplary embodiment.

Referring to FIG. 6, a detailed flow chart of operations illustrating logical operational steps of a method 600 for a single control step of the MPC utilizing the trajectory generator is illustrated, which can be implemented in accordance with an exemplary embodiment. Note that in FIGS. 1-9, identical or similar parts or elements are generally indicated by identical reference numerals. The baseline value u₀ of the manipulated variable can be set to the value of the previous step, u(k−1), as shown at block 805. The internal states of the EKF 310 can be reset to values stored in step k−1, as depicted at block 810. Thereafter, as indicated at block 815, the EKF 310 can be updated utilizing controlled variable y(k−1), manipulated variable u₀ and values of the disturbance variable in time interval [d((k−1)$T_S$), d(k$T_S$)]. Practically, only the initial and finite values of the disturbance variable can be given for each sampling interval; the intermediate values may be obtained by means of interpolation. The corrector 410 can have its state $x_p$ reset to zero, as shown at block 820. The states of the EKF 310 can be stored, as described at block 825. Next, as depicted at block 830, the future nominal trajectory can be predicted.

The predictions of the nominal trajectory can be done recursively for i=0, 1, . . . , N−1, as depicted at blocks 835, 880 and 885 where N is the prediction and optimization horizon. The EKF 310 can be updated utilizing future reference variable r(k+i), (constant) baseline manipulated variable u₀ and (expected) future disturbance variable [d((k+i)$T_S$, d((k+i+1)$T_S$)], as shown at block 840. The linear corrector 410 can be updated by the EKF output prediction error e(k+i|k+i−1), as depicted at block 845. The output and input trajectories yn(i)=ŷ(k+i|k+i)−y_d(k+i), u_n(i)=û_n(k+i|k+i) can be acquired, as described at block 850. The prediction model for $y_{dev}$ utilizing equation (10) can be updated by matrices representing the discrete-time linearized deviation model $A_d$ (k+i), $B_d$(k+i), $C_d$(k+i), as shown at block 855.

Next, as described at block 860, the appropriate constrained optimization problem for free parameters $u_{dev}$(k), ..., $u_{dev}$(k+N−1) can be solved. This optimization problem involves minimizing a cost function subject to appropriate constraints. It is assumed that this cost function comprises a penalty term involving the difference between the nonlinear process output and the reference, as shown in equation (11) below $$E(k+i)=r(k+i)-(y_n(k+i)+y_{dev}(k+i)), i=1,\ldots N \qquad (11)$$

where the future reference points r(k+i) can be a known priori, the nominal trajectory $y_n$ can be computed, as shown at block 830 and $y_{dev}$(k+i) is a linear function of the free parameters $u_{dev}$(k), ..., $u_{dev}$(k+i−1) given by (10). As noted above, it is desirable that the cost function is a quadratic function of the free parameters (i.e. it can contain a quadratic function of the error components E(k+i)), and the constraints are linear functions of these parameters.

Figure 8:
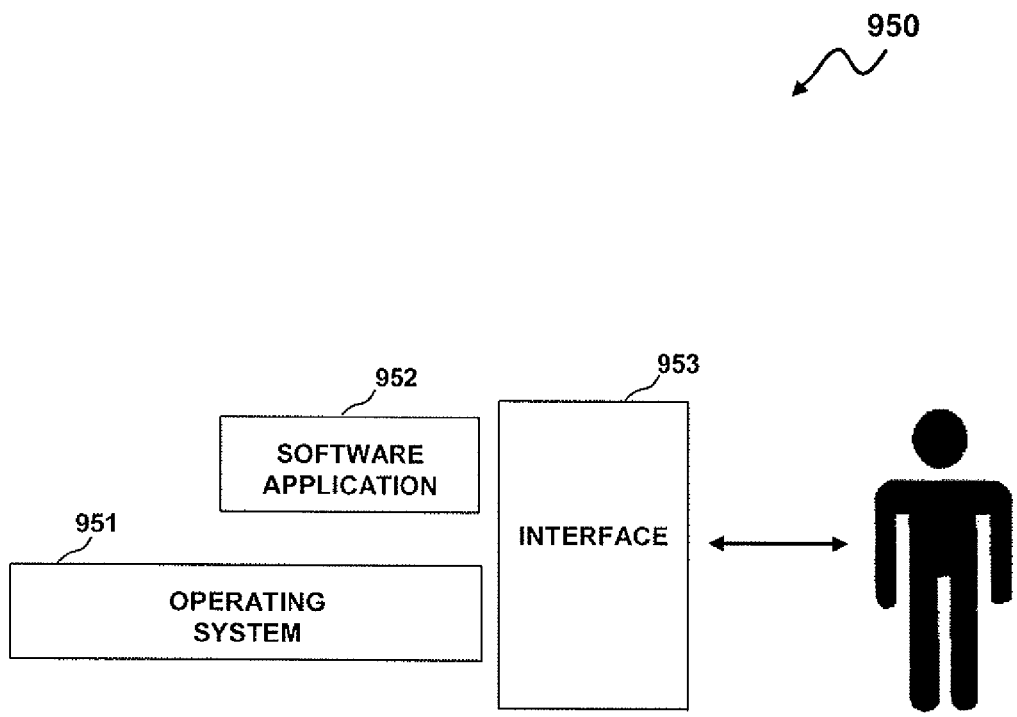
FIG. 8 illustrates a schematic view of a software system including an operating system, application software, and a user interface for carrying out the present invention.

Thereafter, as indicated at block 865, the controlled variable y(k) and the disturbance variable d(k) can be measured using a data-processing system 900 and stored so that the software application 950, as shown in FIG. 8 which performs the algorithm 600, can access it. The manipulated variable u(k) can be set to $u_0+u_n(0)+u_{dev}(k)$ and can be applied to the process (through a proper interface), as shown at block 870. The expected future values such as r(k+1), ... r(k+N); d(k+1), ... d(k+N) can be updated (can be pre-programmed or inferred from a model; references r(k+i) can be set by an operator), as depicted at block 875. In addition, the sequence of future data may be pre-processes (applying upper-lower limits, limiting rate-of-change, smoothened).

Note that EKF 310 depicted in blocks 815 and 840 can be utilized differently such that the former is working as is usual in the industrial practice, dealing with real process measurements. The EKF 310 at block 840 use concerns of the nominal trajectory generation, which is the main aspect of this invention. This EKF processes future data (taken as predictions using models, algorithms, or based on operator's expectations). The expected future data may or may not materialize. Therefore, EKF working on 'real' data' has to keep its state, or save it for the future step. On the other hand, EKF used in the prediction cycle 840 is started with the data from the EKF updated by process data in 815; in the loop 835-885 it is updated by future references/disturbances; its internal state is discarded at the end of the prediction cycle.

Figure 7:
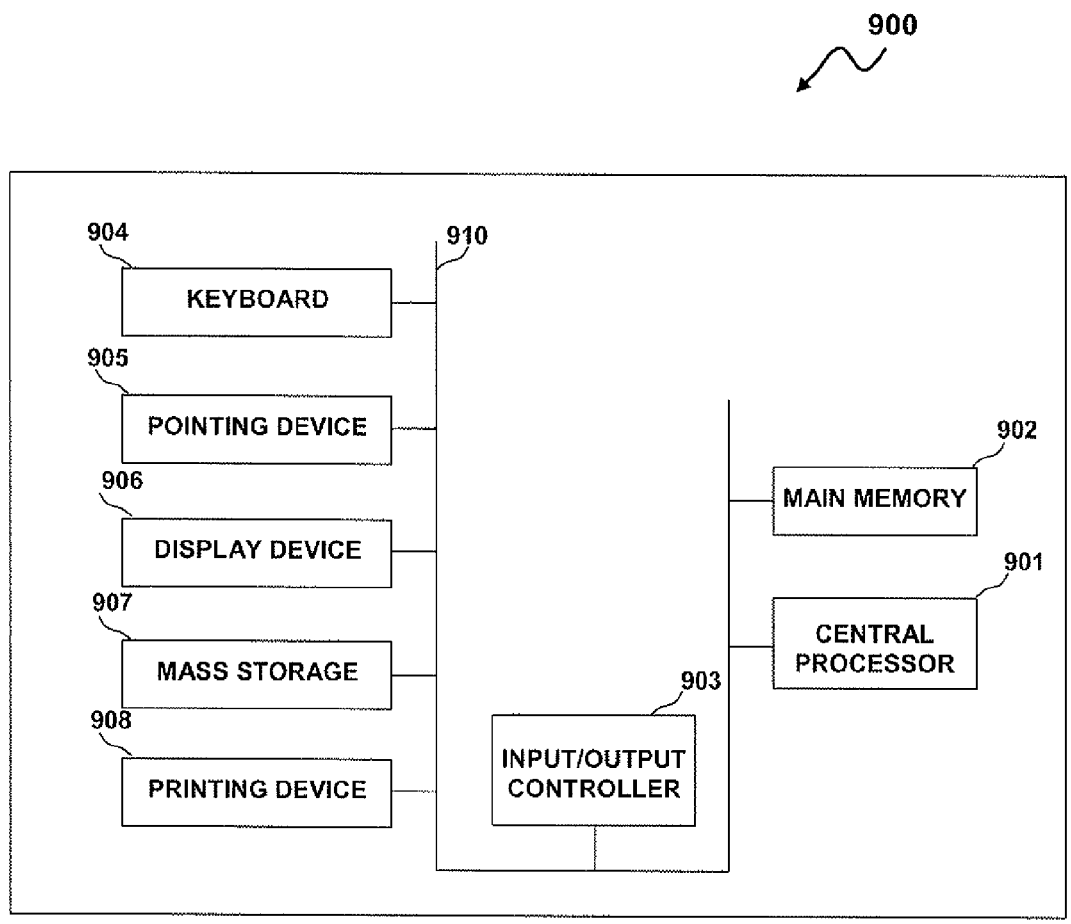
FIG. 7 illustrates a schematic view of a computer system in which the present invention may be embodied.

FIGS. 7-8 are provided as exemplary diagrams of data processing environments in which embodiments of the present invention may be implemented. It should be appreciated that FIGS. 7-8 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 7, the present invention may be embodied in the context of a data-processing apparatus 900 comprising a central processor 901, a main memory 902, an input/output controller 903, a keyboard 904, a pointing device 905 (e.g., mouse, track ball, pen device, or the like), a display device 906, and a mass storage 907 (e.g., hard disk). Additional input/output devices, such as a printing device 908, may be included in the data-processing apparatus 900 as desired. As illustrated, the various components of the data-processing apparatus 900 can communicate through a system bus 910 or similar architecture. Data-processing apparatus may constitute a server or a group of interconnected servers, depending upon design considerations.

Illustrated in FIG. 8, a computer software system 950 is provided for directing the operation of the data-processing apparatus 900 of FIG. 7. Software system 950, which is stored in system memory 902 and on disk memory 907, generally includes a kernel or operating system 951 and a shell or interface 953. One or more application programs, such as application software 952, may be "loaded" (i.e., transferred from storage 907 into memory 902) for execution by the data-processing apparatus 900. The data-processing apparatus 900 receives user commands and data through user interface 953; these inputs may then be acted upon by the data-processing apparatus 900 in accordance with instructions from operating module 951 and/or application module 952.

The interface 953 can be implemented as a graphical user interface (GUI). In some embodiments, operating system 951 and interface 953 can be implemented in the context of a "Windows" system or another type of computer operating system. Application module 952, on the other hand, can include instructions, such as the various operations described herein with respect to the various components and modules described herein, such as, for example, the method/models 100, 200, 300, 400, 500 and 600 depicted and described herein respectively with respect to FIGS. 1-6.

Figure 9:
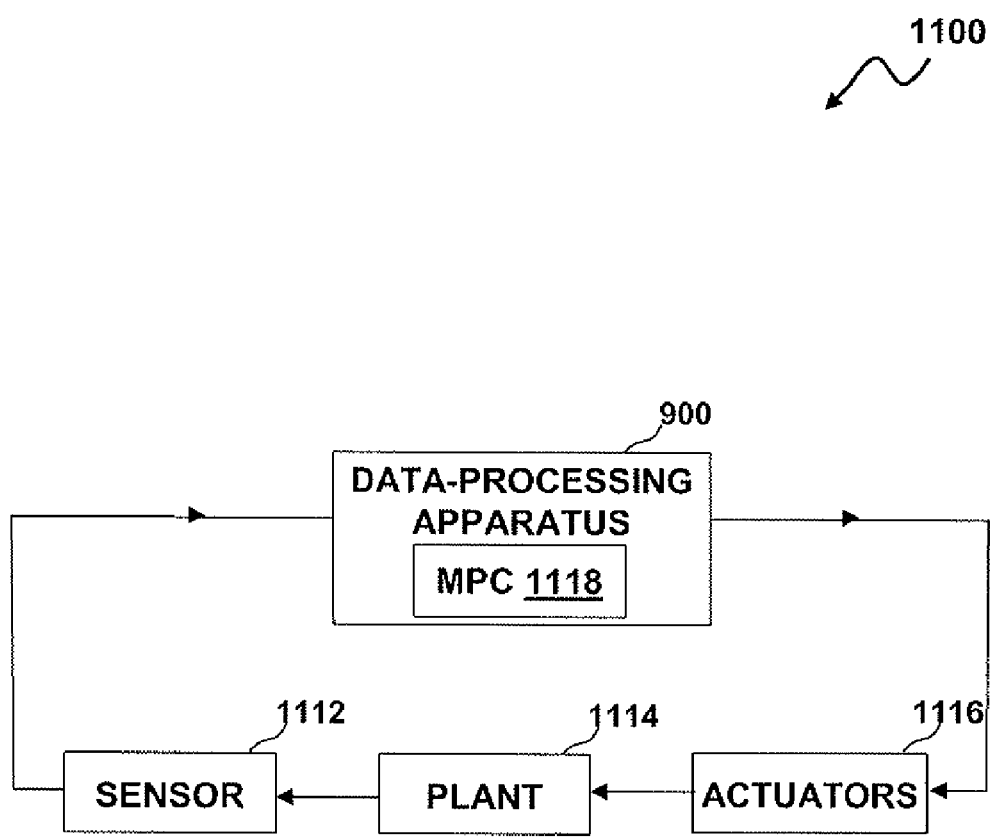
FIG. 9 depicts a schematic view of a process control system in which aspects of the present invention may be implemented.

FIG. 9 illustrates a schematic view of a process control system 1100 in which aspects of the present invention may be implemented. Note that the process control system 1100 can be implemented as a context of a software module such as application software 952, as shown in FIG. 8. The process control system 1100 often utilizes a control system of distributed sensors and actuators to monitor and control operations like food, chemical or materials processing. The process control system 1100 can be adapted for controlling a process using optimal multivariable controllers, in particular model predictive control (MPC) techniques.

The process control system 1100 includes the data-processing apparatus for controlling a plant 1114 with actuators 1116 based upon feedback from sensors 1112 and based upon a desired trajectory. Sensor 1112 monitor, for example, flow rate, pressure and temperature of processed materials, while actuators 1116, for example, control the opening of valves and the regulation of heat. An MPC 1118 computes the optimal sequence of future manipulated variables using models/methods 100-600. The MPC 1118 for predictive control of nonlinear systems is preferably stored in the main memory 902, as a software application 952. The process data from the sensor 1112 can be retrieved which can be processed by the MPC controller 1118 which further sends commands to actuators 1116 through the input/output controller 903.

The following description is presented with respect to embodiments of the present invention, which can be embodied in the context of a data-processing system such as data-processing apparatus 900 and a computer software system 950 depicted respectively FIGS. 7-8. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments which follows is for purpose of illustration and not considered a limitation.

The respective models/methods 100-600 described herein can be implemented in the context of a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems.

It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 600 described herein can be deployed as process software in the context of a computer system or data-processing system as that depicted in FIGS. 7-8.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for the predictive control of a process, comprising:
    estimating a current state of a process model by supplying measured process data to a state estimator;
    estimating a nominal future process input, state and output trajectory data with respect to said process model and
    determining optimal values of deviations of future trajectory data from said nominal future trajectory data, in order to automatically determine manipulated variables to be applied to the process.

2. The computer-implemented method of claim 1 wherein said process model comprises at least one nonlinear process specifically related to a physical process being controlled thereto.

3. The computer-implemented method of claim 1 wherein estimating said nominal future process input, state and output trajectory data with respect to said process model comprises a simultaneous estimation of a future nominal process input, state and output trajectories by supplying a future output reference trajectory and an expected future disturbance to a state estimator containing a nonlinear process model and a model of estimated input generator associated with a linear corrector to perform an approximate signal de-convolution in order to determine a nominal trajectory of at least one manipulated variable for said process model over a selected prediction horizon.

4. The computer-implemented method of claim 1 wherein determining optimal values of deviations of said future process trajectory data from said nominal future trajectory data, in order to automatically determine manipulated variables to be applied to the process, further comprises:

solving a constrained optimization problem involving the output trajectory of a linear parameter-varying system which approximates deviations of said process output trajectory from a nominal output trajectory generated by a state estimator and a linear corrector;
determining a sequence of future optimal deviations of said at least one manipulated variable trajectory from nominal values predicted by said state estimator; and
combining said sequence of future optimal manipulated input deviations and a nominal manipulated input trajectories into a sequence of manipulated variables for a nonlinear process wherein a first step of said sequence of manipulated variables is assumed to be applied with respect to said nonlinear process.

5. A computer-implemented method for the predictive control of nonlinear process models in a single time step, comprising;
    estimating a current state of a process model by supplying a measured process data to a state estimator wherein said process model includes at least one nonlinear process specifically related to a physical process being controlled thereto;
    predicting a future nominal trajectory by supplying a future reference trajectory and an expected future disturbance to said state estimator associated with a linear corrector to perform an approximate signal de-convolution in order to determine a nominal trajectory of at least one manipulated variable for said process model at selected intervals;
    solving a constrained optimization problem involving said output trajectory of a linear parameter-varying system which approximates deviations of said non-linear process output trajectory from said nominal trajectory generated by said state estimator and linear corrector and determining a sequence of future optimal deviations of said at least one manipulated variable from said nominal values predicted by said filter; and
    combining said sequence of future optimal manipulated variable deviations obtained by solving said optimization problem and said nominal manipulated variables generated by said state estimator into a sequence of manipulated variables for said nonlinear process wherein a first step of said sequence of manipulated variables is assumed to be applied on said nonlinear process.

6. The computer-implemented method of claim 5 wherein said signal de-convolution utilizes an extended Kalman filter as a state estimator.

7. The computer-implemented method of claim 5 wherein said state estimator is appended with said linear corrector utilized for correcting a de-convolution error.

8. The computer-implemented method of claim 5 wherein said state estimator generally possesses a filtered process output, an output prediction error, an unknown input estimate and a linearized process representation.

9. The computer-implemented method of claim 5 wherein said signal de-convolution utilizes an extended Kalman filter in order to generate said future nominal trajectory estimates and wherein said extended Kalman filter is appended with said linear corrector utilized for correcting a de-convolution error.

10. The computer-implemented method of claim 5 wherein said signal de-convolution utilizes an extended Kalman filter in order to generate said future nominal trajectory estimates and wherein said extended Kalman filter generally possesses a filtered process output, an output prediction error, an unknown input estimate and a linearized process representation.

11. The computer-implemented method of claim 5 wherein said signal de-convolution utilizes a Kalman smoother in order to further enhance said future nominal trajectory estimates and wherein said smoother is appended with said linear corrector utilized for correcting a de-convolution error.

12. The computer-implemented method of claim 5 wherein said signal de-convolution utilizes a Kalman smoother in order to enhance said future nominal trajectory estimates and wherein said smoother generally possesses a smoothened process output, an output smoothing error, a smoothened unknown input estimate and a linearized process representation.

13. A system for providing secure access to an application over an unsecure network, comprising:
a processor;
a data bus coupled to said processor; and
a computer-usable medium embodying computer code, said computer-usable medium being coupled to said data bus, said computer program code comprising instructions executable by said processor and configured for:
estimating a current state of a process model by supplying a measured process data to a state estimator, wherein said process model includes at least one nonlinear process which is specifically related to a physical process being controlled thereto;
predicting a future nominal trajectory by supplying a future reference trajectory and an expected future disturbance to said state estimator associated with a linear corrector to perform an approximate signal de-convolution in order to determine a nominal trajectory of at least one manipulated variable for said process model at selected intervals;
solving an constrained optimization problem involving said output trajectory of a linear parameter-varying system which approximates deviations of said non-linear process output trajectory from said nominal trajectory generated by said filter and linear corrector and determining a sequence of future optimal deviations of said at least one manipulated variable from said nominal values predicted by said filter; and
combining said sequence of future optimal manipulated variable deviations generated by solving said optimization problem and said nominal manipulated variables generated by said state estimator into a sequence of manipulated variables for said nonlinear process wherein a first step of said sequence of manipulated variables is assumed to be applied on said nonlinear process.

14. The system of claim 13 wherein said signal de-convolution utilizes a Kalman smoother in order to enhance said future nominal trajectory estimates.

15. The system of claim 13 wherein said state estimator is appended with said linear corrector utilized for correcting a de-convolution error.

16. The system of claim 13 wherein said state estimator generally possesses a filtered process output, an output prediction error, an unknown input estimate and a linearized process representation.

17. A computer-usable medium embodying computer program code, said computer program code comprising computer executable instructions configured for:
estimating a current state of a process model by supplying a measured process data to a state estimator, wherein said process model includes at least one nonlinear process which is specifically related to a physical process being controlled thereto;
predicting a future nominal trajectory by supplying a future reference trajectory and an expected future disturbance to said state estimator associated with a linear corrector to perform an approximate signal de-convolution in order to determine a nominal trajectory of at least one manipulated variable for said process model at selected intervals;
solving an constrained optimization problem involving said output trajectory of a linear parameter-varying system which approximates deviations of said non-linear process output trajectory from said nominal trajectory generated by said state estimator and linear corrector and determining a sequence of future optimal deviations of said at least one manipulated variable from said nominal values predicted by said state estimator; and
combining said sequence of future optimal manipulated variable deviations generated by solving said optimization problem and said nominal manipulated variables generated by said state estimator into a sequence of manipulated variables for said nonlinear process wherein a first step of said sequence of manipulated variables is assumed to be applied on said nonlinear process.

18. The computer-usable medium of claim 17 wherein said signal de-convolution utilizes a Kalman smoother in order to enhance said future nominal trajectory estimates.

19. The computer-usable medium of claim 17 wherein said state estimator is appended with said linear corrector utilized for correcting a de-convolution error.

20. The computer-usable medium of claim 17 wherein said state estimator generally possesses a filtered process output, an output prediction error, an unknown input estimate and a linearized process representation.

21. The computer-usable medium of claim 17 wherein said signal de-convolution utilizes a Kalman smoother in order to enhance said future nominal trajectory estimates and wherein said state estimator is appended with said linear corrector utilized for correcting a de-convolution error.

* * * * *